United States Patent
Otani et al.

(10) Patent No.: US 11,184,567 B2
(45) Date of Patent: Nov. 23, 2021

(54) IMAGING DEVICE AND SOLID-STATE IMAGING ELEMENT AND IMAGING METHOD USED THEREIN

(71) Applicant: NUVOTON TECHNOLOGY CORPORATION JAPAN, Kyoto (JP)

(72) Inventors: Mitsuhiko Otani, Osaka (JP); Junichi Matsuo, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 17/162,611

(22) Filed: Jan. 29, 2021

(65) Prior Publication Data

US 2021/0160446 A1 May 27, 2021

Related U.S. Application Data

(63) Continuation of application No. PCT/JP2019/030069, filed on Jul. 31, 2019.

(30) Foreign Application Priority Data

Aug. 2, 2018 (JP) .............................. JP2018-145926

(51) Int. Cl.
*H04N 5/225* (2006.01)
*H04N 5/372* (2011.01)
*H04N 5/3745* (2011.01)

(52) U.S. Cl.
CPC .......... *H04N 5/372* (2013.01); *H04N 5/3745* (2013.01)

(58) Field of Classification Search
None
See application file for complete search history.

(56) References Cited

U.S. PATENT DOCUMENTS

| 2012/0050716 A1* | 3/2012 | Murakami | ............. G01S 17/89 356/4.01 |
| 2015/0092019 A1* | 4/2015 | Asano | ................... G01B 11/026 348/46 |

(Continued)

FOREIGN PATENT DOCUMENTS

| JP | 2001-148867 A | 5/2001 |
| WO | 2015/190015 A1 | 12/2015 |
| WO | 2017/150246 A1 | 9/2017 |

OTHER PUBLICATIONS

International Search Report and Written Opinion dated Oct. 8, 2019 in International Patent Application No. PCT/JP2019/030069; with partial English translation.

*Primary Examiner* — Twyler L Haskins
*Assistant Examiner* — Dwight Alex C Tejano
(74) *Attorney, Agent, or Firm* — McDermott Will and Emery LLP

(57) ABSTRACT

An imaging device includes: a light source emitting light based on a first pulse; a solid-state imaging element including pixel units and exposing the light based on a second pulse; and a signal processor. Each pixel unit includes a photoelectric converter and charge accumulating units, and generates first to third signal charges by first to third exposure processes in this order to be accumulated in the charge accumulating units. Each of the first and third exposure processes is based on the second pulse delayed from the first pulse by a first period, and the second exposure process is based on the second pulse delayed from the first pulse by a second period. A total period of the first and third exposure processes is equal to that of the second exposure process. The signal processor calculates a distance signal for each pixel unit by using the first to third signal charges.

13 Claims, 11 Drawing Sheets

(56) References Cited

U.S. PATENT DOCUMENTS

| | | | |
|---|---|---|---|
| 2015/0109414 A1* | 4/2015 | Adam | G01S 17/18 |
| | | | 348/46 |
| 2016/0097841 A1* | 4/2016 | Otani | G01S 7/4868 |
| | | | 356/5.03 |
| 2016/0173802 A1* | 6/2016 | Matsuo | H04N 5/37213 |
| | | | 348/322 |
| 2016/0344965 A1* | 11/2016 | Grauer | H04N 5/3594 |
| 2017/0074976 A1* | 3/2017 | Takahashi | G01S 7/4865 |
| 2017/0315238 A1* | 11/2017 | Nagai | G01S 17/89 |
| 2018/0011194 A1* | 1/2018 | Masuda | H04N 5/23245 |
| 2018/0053799 A1* | 2/2018 | Otani | G01S 7/4876 |
| 2018/0149750 A1* | 5/2018 | Kishimoto | G01S 17/10 |
| 2019/0007592 A1 | 1/2019 | Otani et al. | |
| 2019/0113332 A1* | 4/2019 | Nishimura | G08G 1/09 |
| 2019/0219891 A1* | 7/2019 | Iwai | H04N 5/232 |

* cited by examiner

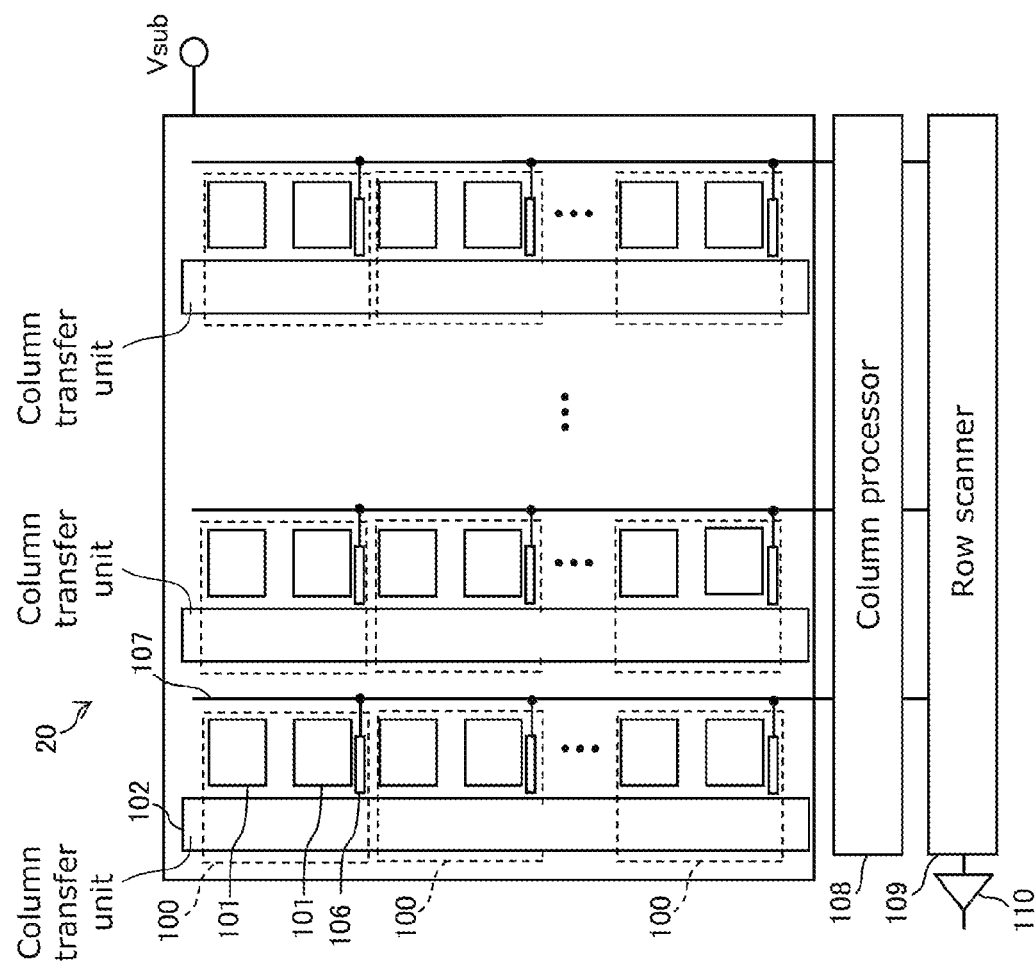

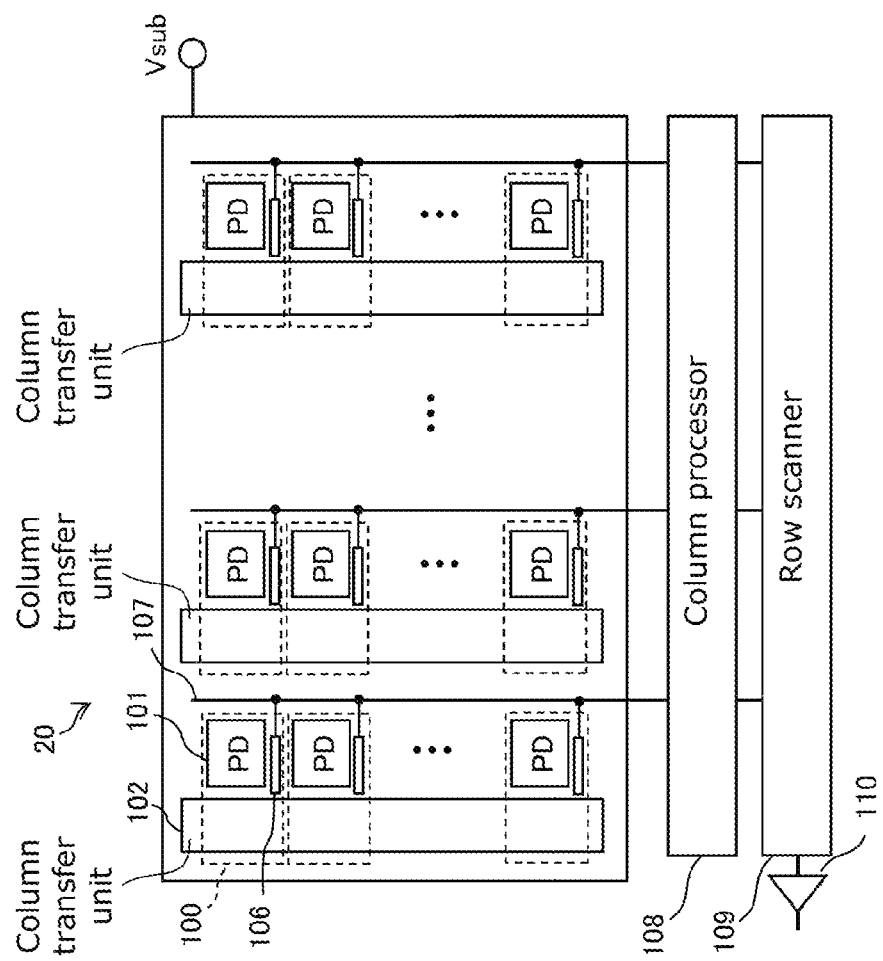

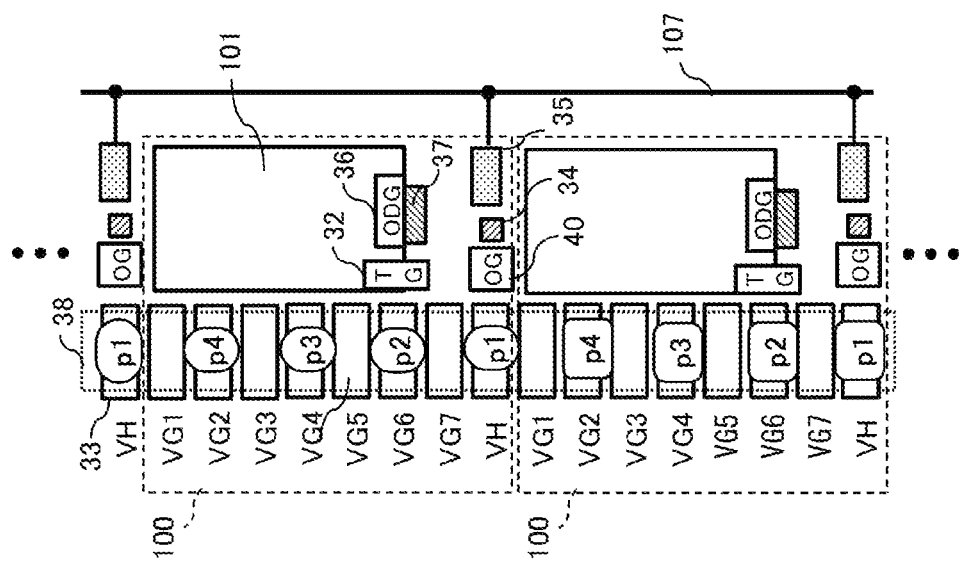

IMAGING DEVICE AND SOLID-STATE IMAGING ELEMENT AND IMAGING METHOD USED THEREIN

CROSS REFERENCE TO RELATED APPLICATIONS

This is a continuation application of PCT International Application No. PCT/JP2019/030069 filed on Jul. 31, 2019, designating the United States of America, which is based on and claims priority of Japanese Patent Application No. 2018-145926 filed on Aug. 2, 2018. The entire disclosures of the above-identified applications, including the specifications, drawings and claims are incorporated herein by reference in their entirety.

FIELD

The present disclosure relates to imaging devices, and solid-state imaging elements and imaging methods used in the imaging devices.

BACKGROUND

One of known methods for body detection is the time-of-flight (TOF) method, in which ranging is performed using the time it takes for light to travel to and from an object to be measured.

Patent Literature 1 discloses a technique for adjusting the number of repetitive emissions of irradiation light according to the ratio between distance information and reflectance information.

CITATION LIST

Patent Literature

PTL 1: Japanese Unexamined Patent Application Publication No. 2001-148867

SUMMARY

Technical Problem

The conventional technique disclosed in Patent Literature 1 has the following problems. For example, if the object is close to an imaging device or has a high reflectance, signal charge resulting from the reflected light may saturate to prevent ranging. If the object is far from the imaging device and has a low reflectance, the amount of signal charge resulting from the reflected light may be too small, reducing the accuracy of ranging.

In view of the above problems, an object of the present disclosure is to provide an imaging device, a solid-state imaging element, and an imaging method that prevent signal charge saturation for a close object having a high reflectance, and prevent a reduced accuracy of ranging for a distant object having a low reflectance.

Solution to Problem

In order to solve the above problem, an imaging device according to an aspect of the present disclosure includes: a controller that generates a first pulse for instructing light emission and a second pulse for instructing light exposure; a light source that emits light in accordance with the first pulse; an imager including a solid-state imaging element that exposes the light in accordance with the second pulse; and a signal processor, wherein the solid-state imaging element includes pixel units, the pixel units each including: a photoelectric converter that converts the light exposed into signal charge; and a plurality of charge accumulating units accumulating the signal charge, in each of the pixel units, the signal charge includes first signal charge obtained by a first exposure process, second signal charge obtained by a second exposure process, and third signal charge obtained by a third exposure process which are accumulated in different charge accumulating units among the plurality of charge accumulating units, the first exposure process and the third exposure process each being performed in accordance with the second pulse that is delayed from the first pulse by a first delay time period, the second exposure process being performed in accordance with the second pulse that is delayed from the first pulse by a second delay time period, the first exposure process, the second exposure process, and the third exposure process are performed in this order, and a total of an exposure time period of the first exposure process and an exposure time period of the third exposure process is equal to an exposure time period of the second exposure process, and the signal processor calculates a distance signal for each of the pixel units by using the first signal charge obtained by the first exposure process, the second signal charge obtained by the second exposure process, and the third signal charge obtained by the third exposure process.

Advantageous Effects

The imaging device according to the present disclosure enables preventing signal charge saturation for a close object having a high reflectance, and preventing a reduced accuracy of ranging for a distant object having a low reflectance.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A is a block diagram showing an exemplary configuration of a solid-state imaging element according to Embodiment 1.

FIG. 6A is a block diagram showing an exemplary configuration of a solid-state imaging element according to Embodiment 2.

FIG. 6B is a diagram showing an exemplary configuration of each pixel unit in the solid-state imaging element according to Embodiment 2.

DESCRIPTION OF EMBODIMENTS

Hereinafter, certain exemplary embodiments of the imaging device and the solid-state imaging element used therein will be described in detail with reference to the accompanying Drawings. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure.

However, unnecessarily detailed description may be omitted. For example, detailed explanation of a well-known matter and repeated description of substantially identical structures may be omitted. Such omission makes the following description exclude unnecessary redundancy and be easily understood by those skilled in the art.

Embodiment 1

Figure 1:
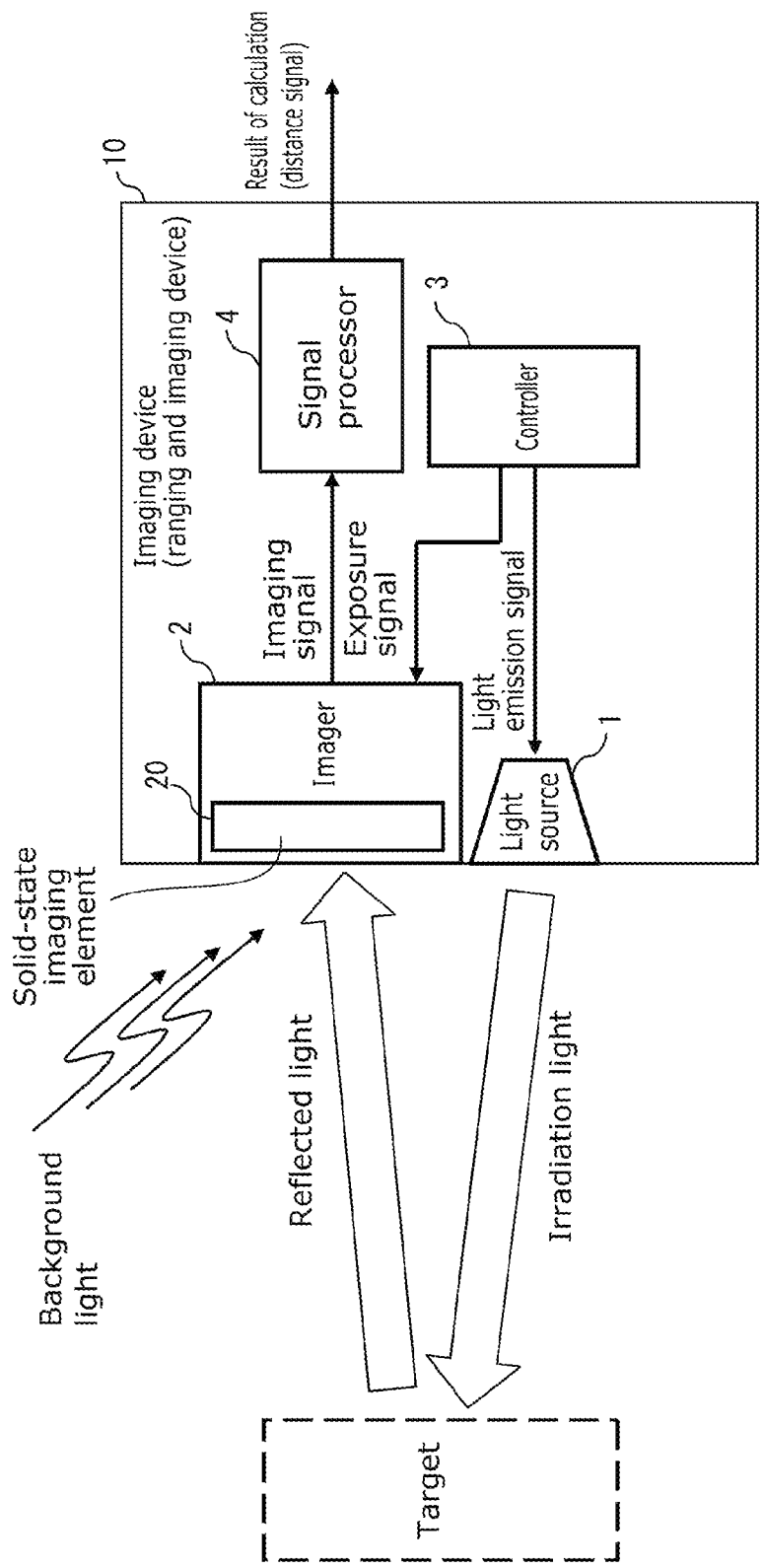
FIG. 1 is a functional block diagram showing an exemplary configuration of an imaging device according to Embodiment 1.

FIG. 1 is a functional block diagram showing an exemplary schematic configuration of imaging device (ranging and imaging device) 10 according to an embodiment. As shown in the figure, imaging device 10 includes light source 1, imager 2, controller (driving controller) 3, and signal processor 4. This configuration allows imaging device 10 to take still images as well as moving images.

Light source 1 has a light emission element and emits irradiation light. The light emission element is, for example, a laser diode, a vertical-cavity surface-emitting laser (VCSEL), or a light emitting diode (LED), although other types of light emission elements may also be used. The irradiation light is, for example, infrared light (including near-infrared light and far-infrared light).

Controller 3 generates a light emission signal for instructing light irradiation of a target object (a body, or an object to be measured), and an exposure signal for instructing exposure to reflected light from the target object, and background light to be described below. The light emission signal includes first pulses for instructing light source 1 to emit light. The exposure signal includes second pulses for instructing imager 2 to perform exposure.

Light source 1 irradiates an imaging area including the target object with pulsed light according to the timing of the first pulses of the light emission signal generated by controller 3.

Imager 2 includes solid-state imaging element 20. Solid-state imaging element 20 receives reflected light (pulsed light) resulting from the irradiation light from light source 1. Solid-state imaging element 20 also generates an offset component such as a dark current signal or a background light signal caused by sunlight or the like.

Solid-state imaging element 20 performs exposure for the imaging area including the target object according to the timing indicated by the second pulses of the exposure signal generated by controller 3. Specifically, while light source 1 repeatedly emits the pulsed irradiation light, solid-state imaging element 20 performs first, second, third, and fourth exposure processes according to the exposure signal from controller 3. The first, second, third, and fourth exposure processes are each a combination of light emission by light source 1 and exposure by imager 2. A delay time period is provided between each first pulse for instructing light emission and each second pulse for instructing exposure. In the fourth exposure process, however, the light emission signal includes no first pulses (that is, light source 1 does not emit light).

Imager 2 further includes circuits as appropriate, such as a camera lens, an optical band-pass filter that passes only wavelengths around the light emitted from light source 1, and an A/D converter.

Signal processor 4 calculates and outputs a distance image (distance signal or distance information) based on the amount of exposure in an imaging signal received from imager 2.

Now, an example of solid-state imaging element 20 in imager 2 of imaging device 10 according to this embodiment will be described.

FIG. 2A is a block diagram showing an exemplary configuration of solid-state imaging element 20 according to Embodiment 1. As shown in the figure, solid-state imaging element 20 includes: two-dimensionally arranged pixel units 100; column transfer units 102 provided for respective columns of pixel units 100; column signal lines 107 provided for the respective columns; column processor 108; row scanner 109; and output buffer 110. This solid-state imaging element 20 is an example of a hybrid configuration having column transfer units 102 of a general Charge Coupled Device (CCD) image sensor, as well as reading units 106 and column signal lines 107 of a general Complementary Metal Oxide Semiconductor (CMOS) image sensor. The CMOS and CCD hybrid configuration here refers to a structure having both a characteristic of CMOS, i.e., selectively outputting voltage signals to column signal lines, and a characteristic of CCD, i.e., forming a charge transfer path as a signal accumulation area for each pixel.

Each of pixel units 100 has two photoelectric converters 101, multiple charge accumulating units, and reading unit 106. Each pixel unit 100 in FIG. 2A has what is called the 2-pixels-in-1-cell structure, so that the pixel unit has two pixels, i.e., two photoelectric converters 101.

Each photoelectric converter 101 is a photodiode, for example, and converts received light into signal charge.

Each of the charge accumulating units is an area for holding the signal charge resulting from the conversion by photoelectric converters 101, and is formed in FIG. 2A as a potential well in column transfer units 102. The charge accumulating units include four charge accumulating units, first to fourth, for each pixel unit 100. That is, at least four potential wells are formed for each pixel unit 100 in column transfer units 102. The first to fourth charge accumulating units accumulate signal charge corresponding to first to fourth exposure processes, respectively.

Reading units 106 read signal charge in specific charge accumulating units in column transfer units 102, convert the signal charge into voltage, and output the voltage to column signal lines 107.

Column transfer units 102 each include a column transfer channel and column transfer gates. The column transfer gates are multiple types of column transfer electrodes that cover the column transfer channel. Combinations of voltages applied to the column transfer gates form, as the charge accumulating units, potential wells in the column transfer channel. Hereafter, the potential wells may be referred to as packets.

Column processor 108 receives signals from column signal lines 107 provided for the respective columns of pixel units 100, subjects the signals to correlated double sampling (CDS), and outputs the signals as pixel signals.

Row scanner 109 scans the pixel signals output from column processor 108, i.e., sequentially selects and outputs the pixel signals one by one.

Column processor 108 may further have an A/D converter for converting the signals into digital signals on column basis.

Output buffer 110 outputs the pixel signals received from row scanner 109.

Now, a more specific exemplary configuration of each pixel unit 100 will be described.

Figure 2B:
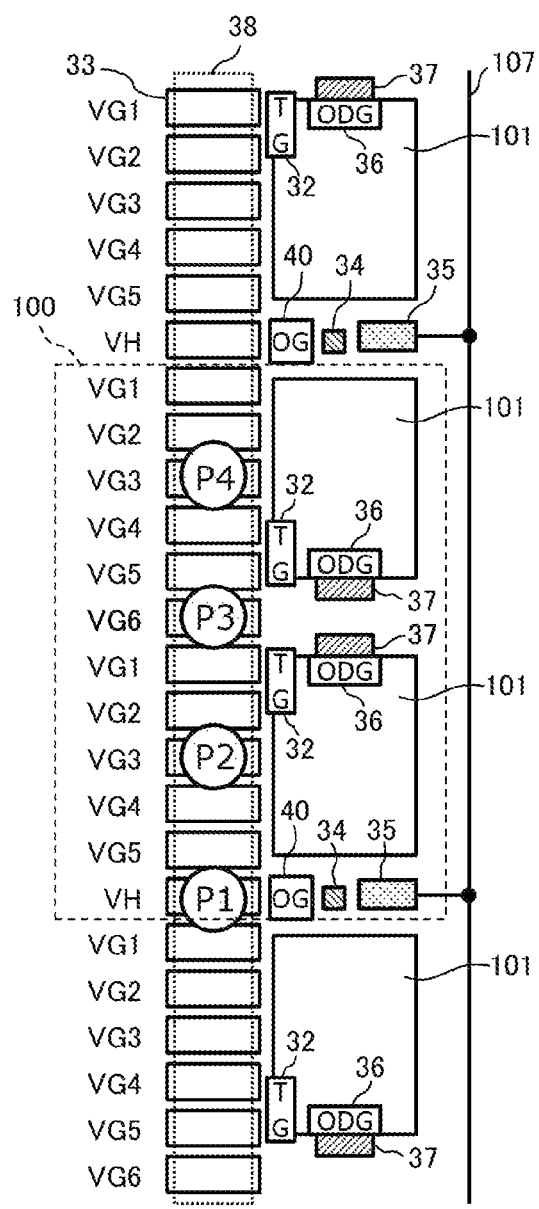
FIG. 2B is a diagram showing an exemplary configuration of each pixel unit in the solid-state imaging element according to Embodiment 1.

FIG. 2B is a diagram showing an exemplary configuration of each pixel unit 100 in the solid-state imaging element according to Embodiment 1. Pixel unit 100 in the figure represents an example of the 2-pixels-in-1-cell structure shown in FIG. 2A. This pixel unit 100 includes first to fourth charge accumulating units P1 to P4, two photoelectric converters 101, floating diffusion layer (floating diffusion) 34, reading circuit 35, and output control gate 40. Each photoelectric converter 101 has reading gate 32, exposure control gate 36, and overflow drain 37.

First to fourth charge accumulating units P1 to P4 are formed as four packets at positions corresponding to pixel unit 100 in column transfer unit 102. Column transfer unit 102 has six types of column transfer gates 33 for each photoelectric converter 101. Six types of column transfer gates 33 are denoted as VG1 to VG6. However, column transfer gate VG6 corresponding to output control gate 40 is denoted as VH. More specifically, first to fourth charge accumulating units P1 to P4 are formed as four packets in column transfer channel 38 according to combinations of voltages applied to column transfer gates 33. In the figure, first charge accumulating unit P1 corresponds to column transfer gate VH. Second charge accumulating unit P2 corresponds to column transfer gate VG3. Third charge accumulating unit P3 corresponds to column transfer gate VG6. Fourth charge accumulating unit P4 corresponds to column transfer gate VG3. In the example in FIG. 2B, however, the positions of first to fourth charge accumulating units P1 to P4 are not fixed but moved up or down as signal charge is transferred forward or backward through the column.

Reading gates 32 are gate electrodes that transfer, to column transfer unit 102 according to voltage applied to reading gates 32, signal charge resulting from conversion by photoelectric converters 101. Of two reading gates 32 in a dashed-line frame representing pixel unit 100 in FIG. 2B, upper reading gate 32 transfers the signal charge of upper photoelectric converter 101 to column transfer gate VG5 in column transfer unit 102. Lower reading gate 32 transfers the signal charge of lower photoelectric converter 101 to column transfer gate VG1.

Exposure control gates 36 control exposure of photoelectric converters 101 according to voltage applied to exposure control gates 36. Exposure control gates 36 receive input of the exposure signal that includes, for example, active-low (i.e., negative-logic) second pulses. For example, when the exposure signal is at High level, the signal charge of photoelectric converters 101 is released to overflow drains 37 to cancel the photoelectric conversion. That is, photoelectric converters 101 are cleared and brought into an unexposed state. When the exposure signal is at Low level, photoelectric converters 101 are brought into an exposed state in which signal charge corresponding to the amount of light received is generated. While the second pulses are at Low level, photoelectric converters 101 are in the exposed state. Further, if reading gates 32 are open (if reading gates 32 are at High level), the signal charge resulting from the conversion by photoelectric converters 101 are transferred to and accumulated in column transfer unit 102 via reading gates 32.

Overflow drains 37 are areas for releasing the signal charge of photoelectric converters 101.

The circuit including output control gate 40, floating diffusion layer 34, and reading circuit 35 corresponds to reading unit 106 in FIG. 2A.

Output control gate 40 is a gate electrode for transferring the signal charge in the packet formed at column transfer gate VH to floating diffusion layer 34.

Floating diffusion layer 34 converts the signal charge transferred from column transfer unit 102 via output control gate 40 into voltage.

Reading circuit 35 outputs, to column signal line 107, the signal converted into the voltage by floating diffusion layer 34. Reading circuit 35 has, for example, a selecting transistor and an amplifying transistor. The amplifying transistor, together with a load circuit connected to column signal line 107, forms a source follower circuit.

Now, imaging operations of imager 2 according to Embodiment 1 will be described.

Figure 3:
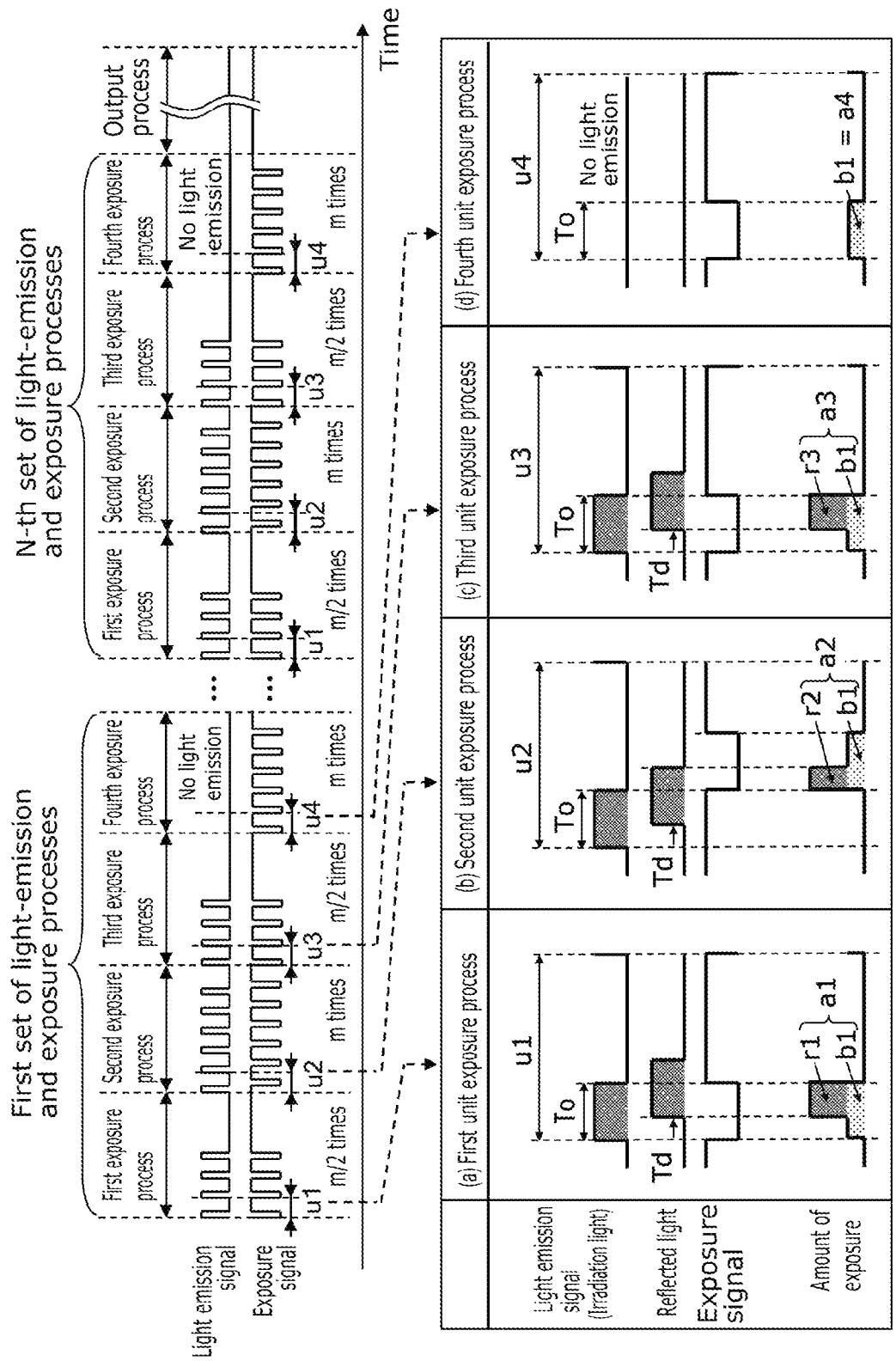
FIG. 3 is a timing chart for describing exemplary imaging operations of the imaging device according to Embodiment 1.
Figure 4:
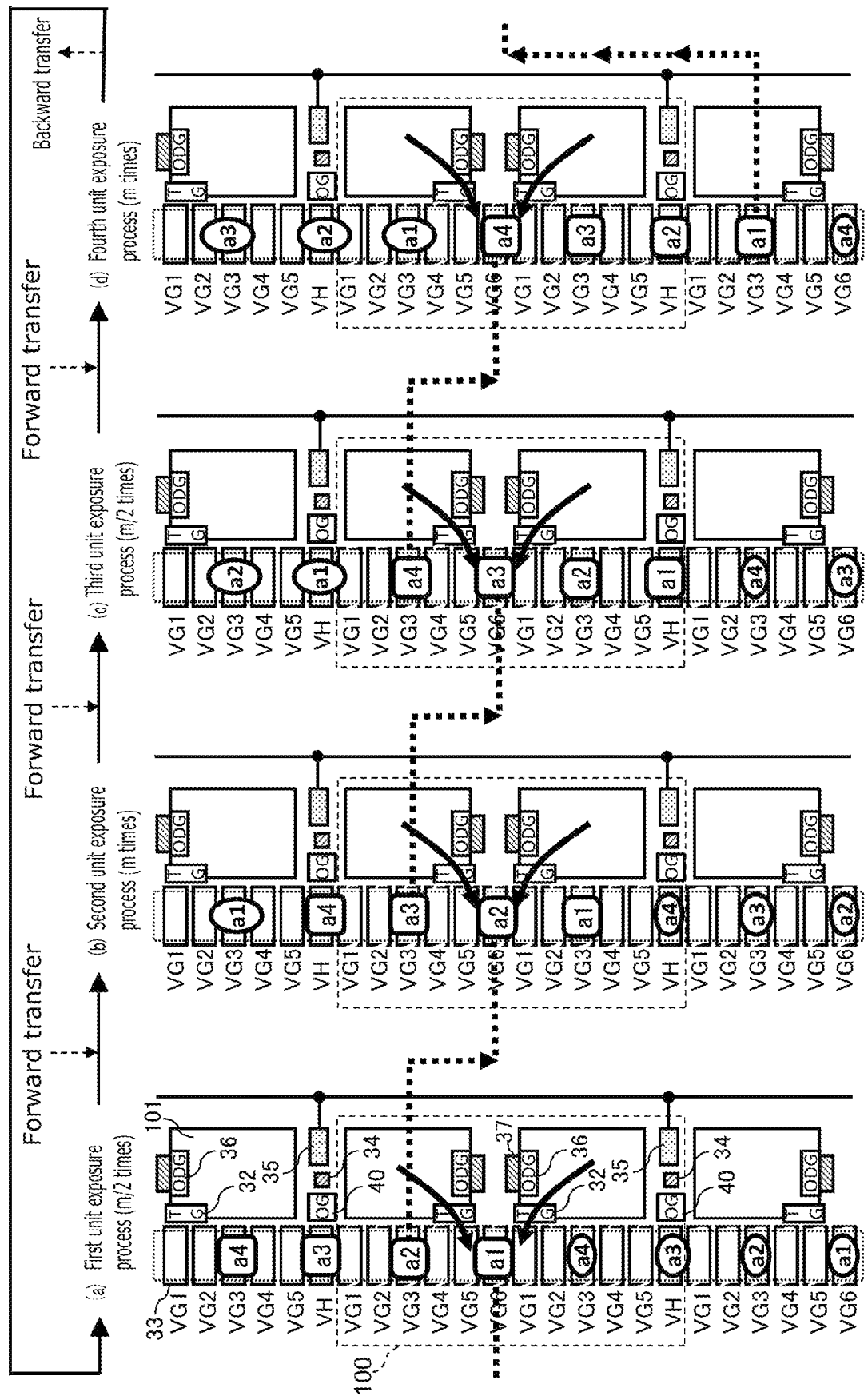
FIG. 4 is an illustrative diagram showing exemplary operations in first to fourth unit exposure processes in each pixel unit in the solid-state imaging element according to Embodiment 1.
Figure 5:
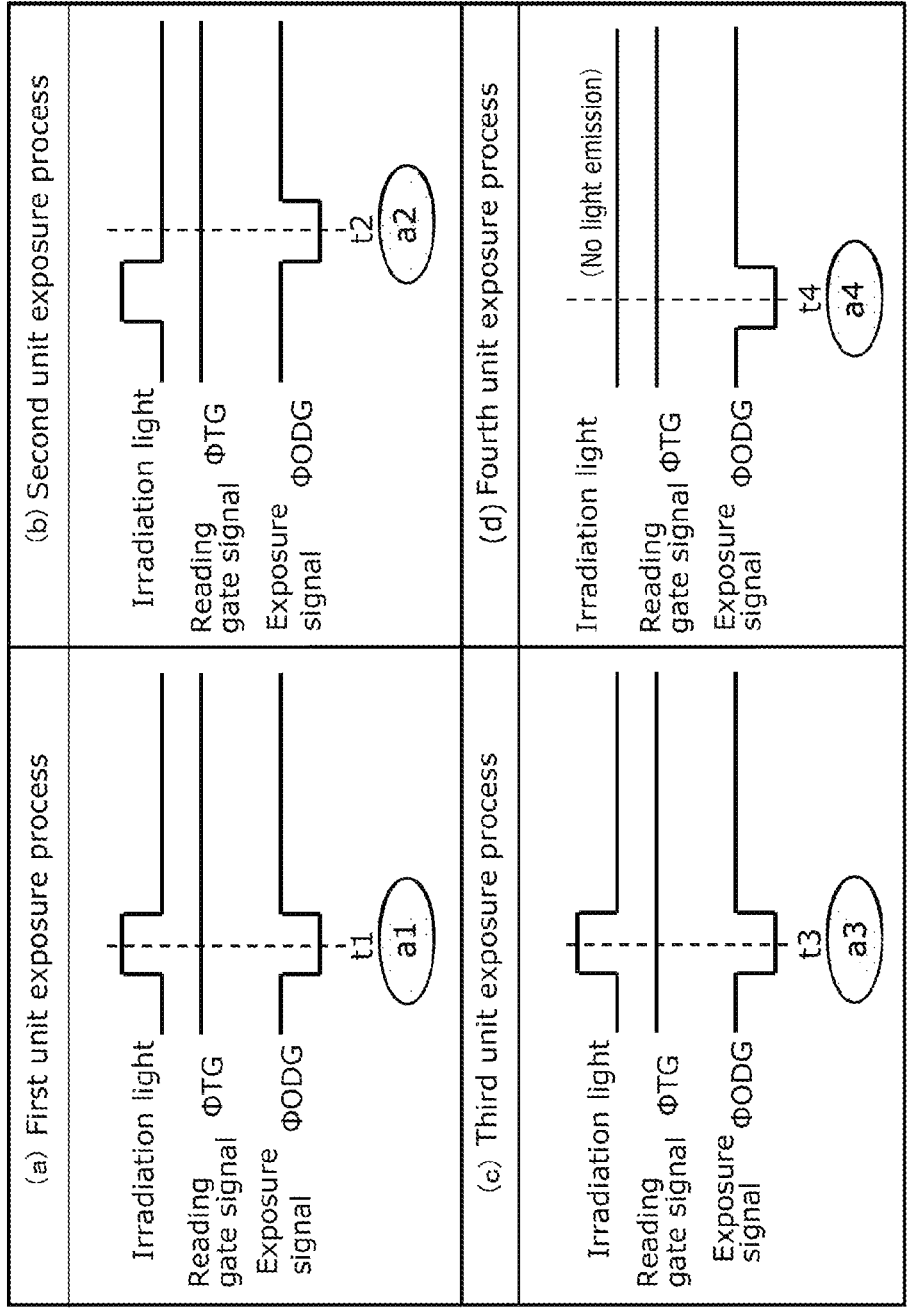
FIG. 5 is a timing chart for describing exemplary operations in the first to fourth unit exposure processes according to Embodiment 1.

FIG. 3 is a timing chart for describing exemplary imaging operations of imaging device 10 according to Embodiment 1. FIG. 4 is an illustrative diagram showing exemplary operations in first to fourth unit exposure processes in each pixel unit 100 in solid-state imaging element 20 according to Embodiment 1. FIG. 5 is a timing chart for describing exemplary operations in the first to fourth unit exposure processes according to Embodiment 1.

The upper layer in FIG. 3 shows an exemplary time chart of the light emission signal and the exposure signal in imaging operations for one screen. In the upper layer of the figure, the abscissa indicates a time axis, and the ordinate indicates the light emission signal and the exposure signal. The light emission signal is a digital signal having first pulses for instructing light emission. The first pulses in the figure, which are positive-logic pulses, instruct light source 1, at High level, to emit light and, at Low level, not to emit light. The exposure signal is a digital signal having second pulses for instructing exposure. The second pulses in the figure, which are negative-logic pulses, instruct solid-state imaging element 20, at Low level, to perform exposure and, at High level, not to perform exposure.

The imaging operations for one screen include N sets of light-emission and exposure processes, and an output process. N is an integer greater than one.

One set of light-emission and exposure processes includes first, second, third, and fourth exposure processes.

The first exposure process includes m1 first unit exposure processes. m1 is an integer greater than 0. In each first unit exposure process, controller 3 generates the light emission signal and the exposure signal such that a second pulse is delayed behind a first pulse by a first delay time period. Signal charge generated by photoelectric converters 101 in the first exposure process is accumulated in first charge accumulating unit P1.

The second exposure process includes m2 second unit exposure processes. m2 is an integer greater than 1. In each second unit exposure process, controller 3 generates the light emission signal and the exposure signal such that a second pulse is delayed behind a first pulse by a second delay time period. Signal charge generated by photoelectric converters 101 in the second exposure process is accumulated in second charge accumulating unit P2.

The third exposure process includes m3 third unit exposure processes. m3 is an integer greater than 0. Each third unit exposure process is the same as each first unit exposure process. That is, in the third unit exposure process, controller 3 generates the light emission signal and the exposure signal such that a second pulse is delayed behind a first pulse by the first delay time period. Signal charge generated by photoelectric converters 101 in the third exposure process is accumulated in third charge accumulating unit P3.

The fourth exposure process includes m4 fourth unit exposure processes. In each fourth unit exposure process, controller 3 generates the light emission signal and the exposure signal such that no first pulse but only a second pulse is generated. Signal charge generated by photoelectric converter 101 in the fourth exposure process is accumulated in fourth charge accumulating unit P4.

(a) in FIG. 3 and (a) in FIG. 4 show the timing of detecting the amount of exposure a1 in the first unit exposure process. (b) in FIG. 3 and (b) in FIG. 4 show the timing of detecting the amount of exposure a2 in the second unit exposure process. (c) in FIG. 3 and (c) in FIG. 4 show the timing of detecting the amount of exposure a3 in the third unit exposure process. (d) in FIG. 3 and (d) in FIG. 4 show the timing of detecting the amount of exposure a4 in the fourth unit exposure process. One set of light-emission and exposure processes is divided into multiple types of exposure processes (the first to fourth exposure processes).

Here, the numbers of repetitions m1 to m4 of the first to fourth unit exposure processes will be described. The example in the upper layer in FIG. 3 assumes that m1=m/2, m2=m, m3=m/2, and m4=m, where m is an even number greater than or equal to 2. The first unit exposure process is the same as the third unit exposure process. In other words, the first exposure process and the third exposure process result from dividing m sequential first (or third) unit exposure processes into two sets of processes, each set including m/2 sequential unit exposure processes. This does not simply mean that the sequential processes are divided; the signal charge generated in the first exposure process and the signal charge generated in the third exposure process are separately accumulated in the first and third charge accumulating units P1 and P3, respectively. Accumulating the signal charge separately in the first and third charge accumulating units P1 and P3 can double the capacity compared with the case of using a single charge accumulating unit. This can prevent saturation.

The output process in the upper layer in FIG. 3 is a process for outputting the signal charge accumulated in the first to fourth charge accumulating units P1 to P4 in the N sets of light-emission and exposure processes. The signal charge is output as an imaging signal for each pixel unit 100 from solid-state imaging element 20 to signal processor 4.

Now, the first to fourth unit exposure processes will be more specifically described.

(a) in FIG. 3 shows an exemplary time chart enlarging period u1 of the first unit exposure process in the upper layer in FIG. 3. Specifically, as indicated by the ordinate, (a) in FIG. 3 shows "light emission signal (irradiation light)," "reflected light," "exposure signal," and "amount of exposure" in the first unit exposure process.

In (a) in FIG. 3, "light emission signal" has a first pulse, which is a positive-logic pulse over a period To. During the period To of the first pulse, pulsed irradiation light is emitted from light source 1. "Reflected light" indicates exemplary reflected light resulting from the light emitted by light source 1 in response to the first pulse and reflected on the object to reach solid-state imaging element 20. The reflected light shown here reaches solid-state imaging element 20 a delay time period Td after the irradiation light corresponding to the first pulse of the light emission signal. "Exposure signal" has a second pulse, which is a negative-logic pulse over the period To. The pulse width of the second pulse is set to To as with the first pulse. The period from the rising edge of the first pulse to the falling edge of the second pulse is a first delay time period. In (a) in FIG. 3, however, the first delay time period is set to 0. "Amount of exposure" indicates the amount of exposure of solid-state imaging element 20 (i.e., the amount of signal charge generated by photoelectric converters 101) in the exposure period indicated by the exposure signal (i.e., the Low-level period To of the second pulse). The amount of exposure a1 includes reflected light r1 resulting from the irradiation light from light source 1 reflected on the object, and background light b1 that is outside light such as sunlight. Reflected light r1 used for the exposure is the portion of the pulsed reflected light corresponding to its beginning to the end of the second pulse. Background light b1 always exists during the exposure period To. Signal charge for the amount of exposure a1 generated by the exposure in photoelectric converters 101 is accumulated in first charge accumulating unit P1 in the m/2×N first unit exposure processes shown in the upper layer in FIG. 3.

In other words, as shown in the upper layer and (a) in FIG. 3, in the first unit exposure process, photoelectric converters 101 are exposed during the period in which the second pulse of the exposure signal is Low, and signal charge a1 generated by the exposure is accumulated in first charge accumulating unit P1 in column transfer unit 102. Controller 3 performs control to repeat this operation m/2 times in this embodiment. As shown in FIG. 4, upon completion of the m/2 first unit exposure processes, solid-state imaging element 20 causes column transfer gates 33 in column transfer unit 102 to transfer the above signal charge a1 to a packet for which no reading gates 32 exist. That is, first to fourth charge accumulating units P1 to P4 are shifted forward by one level. Consequently, as indicated by a dotted line in FIG. 4, first charge accumulating unit P1 leaves the position where reading gates 32 exist, and second charge accumulating unit P2 moves to the position where reading gates 32 exist.

The first unit exposure process here is a process in which, while light source 1 receives the first pulse of the light emission signal and emits light, solid-state imaging element 20 receives the second pulse of the exposure signal having the first delay time period and performs exposure. In this embodiment, the pulse width of the second pulse is set to To as with the first pulse, and the first delay time period is set to 0. That is, the exposure period in the first unit exposure process is set to coincide with the period in which the light emission signal is active (the first pulse is at High level).

(b) in FIG. 3 shows an exemplary time chart enlarging period u2 of the second unit exposure process in the upper layer in FIG. 3. (b) in FIG. 3 is different from (a) in the figure in the timing of the exposure signal and the amount of exposure. The following will mainly describe differences. "Exposure signal" has a second delay time period from the rising edge of the first pulse to the falling edge of the second pulse, which is longer than the above first delay time period. In (b) in FIG. 3, the second delay time period is set to To as with the pulse width of the first pulse and the second pulse.

"Amount of exposure" indicates the amount of exposure a2 of solid-state imaging element 20 in the exposure period indicated by the exposure signal (i.e., the Low-level period To of the second pulse). The amount of exposure a2 includes reflected light r2 resulting from the irradiation light from light source 1 reflected on the object, and background light b1 that is outside light such as sunlight. Reflected light r2 used for the exposure is the portion of the pulsed reflected light overlapping the second pulse. For example, reflected light r2 used for the exposure is the portion corresponding to the period from the falling edge of the second pulse to the end of the reflected light. Background light b1 in the second unit exposure process is substantially the same as background light b1 in the first unit exposure process. Signal charge for the amount of exposure a2 generated by the exposure in photoelectric converter 101 is accumulated in second charge accumulating unit P2 in the m×N second unit exposure processes shown in the upper layer in FIG. 3.

In other words, as shown in the upper layer and (b) in FIG. 3, in the second unit exposure process, photoelectric converters 101 are exposed during the period in which the second pulse of the exposure signal is Low, and signal charge a2 generated by the exposure is accumulated in second charge accumulating unit P2 in column transfer unit 102. Controller 3 repeats this operation m times in this embodiment. Upon completion of the m second unit exposure processes, solid-state imaging element 20 causes column transfer gates 33 in column transfer unit 102 to transfer the above signal charge a2 to a packet for which no reading gates 32 exist. That is, first to fourth charge accumulating units P1 to P4 are shifted forward by one level. Consequently, as indicated by a dotted line in FIG. 4, second charge accumulating unit P2 leaves the position where reading gates 32 exist, and third charge accumulating unit P3 moves to the position where reading gates 32 exist.

The second unit exposure process here is a process in which, while light source 1 receives the first pulse of the light emission signal and emits light, solid-state imaging element 20 receives the second pulse of the exposure signal having the second delay time period different from the first delay time period and performs exposure. In this embodiment, the pulse width of the second pulse is set to To as with the first pulse, and the second delay time period is set to To, which is the sum of the first delay time period (0 in FIG. 3) and the pulse width To of the first pulse.

(c) in FIG. 3 shows an exemplary time chart enlarging period u3 of the third unit exposure process in the upper layer in FIG. 3. In (c) in FIG. 3, the timing of the exposure signal and the amount of exposure are exactly the same as those in (a) in the figure. Reflective light r3 is the same as reflective light r1, and the amount of exposure a3 is the same as the amount of exposure a1. Signal charge for the amount of exposure a3 generated by the exposure in photoelectric converter 101 is accumulated in third charge accumulating unit P3 in the m/2×N third unit exposure processes shown in the upper layer in FIG. 3.

In other words, as shown in the upper layer and (c) in FIG. 3, in the third unit exposure process, photoelectric converters 101 are exposed during the period in which the second pulse of the exposure signal is Low, and signal charge a3 generated by the exposure is accumulated in third charge accumulating unit P3 in column transfer unit 102. Controller 3 repeats this operation m/2 times in this embodiment. Upon completion of the m/2 third unit exposure processes, solid-state imaging element 20 causes column transfer gates 33 in column transfer unit 102 to transfer the above signal charge a3 to a packet for which no reading gates 32 exist. That is, first to fourth charge accumulating units P1 to P4 are shifted forward by one level. Consequently, as indicated by a dotted line in FIG. 4, third charge accumulating unit P3 leaves the position where reading gates 32 exist, and fourth charge accumulating unit P4 moves to the position where reading gates 32 exist.

The third unit exposure process here is a process in which, while light source 1 receives the first pulse of the light emission signal and emits light, solid-state imaging element 20 receives the second pulse of the exposure signal having the same delay time period as the first delay time period and performs exposure. In this embodiment, the pulse width of the second pulse of the exposure signal is set to To as with the first pulse in the first and second unit exposure processes, and the delay time period is set to 0. That is, as in the first unit exposure process, the exposure period in the third unit exposure process is set to coincide with the period in which the light emission signal is being sent (is at High level).

In this embodiment, the exposure process having the minimum delay time period from the rising edge of the first pulse to the falling edge of the second pulse is divided into the first exposure process and the third exposure process. In other words, at least one of the multiple types of exposure processes is subdivided.

(d) in FIG. 3 shows an exemplary time chart enlarging period u4 of the fourth unit exposure process in the upper layer in FIG. 3. (d) in FIG. 3 is different from (a) in the figure in that the light emission signal has no first pulse. The following will mainly describe differences. "Light emission signal" has no first pulse. That is, controller 3 generates the light emission signal and the exposure signal such that no first pulse but only a second pulse is generated. Because no reflection light exists, "amount of exposure" indicates only the background light. Background light b4 is substantially the same as background light b1. Signal charge for the amount of exposure a4 generated by the exposure in photoelectric converter 101 is accumulated in fourth charge accumulating unit P4 in the m×N fourth unit exposure processes shown in the upper layer in FIG. 3.

In other words, as shown in the upper layer and (d) in FIG. 3, in the fourth unit exposure process, light source 1 does not emit light. Photoelectric converters 101 are exposed during the period in which the second pulse of the exposure signal is Low, and signal charge a4 generated by the exposure is accumulated in fourth charge accumulating unit P4 in column transfer unit 102. Controller 3 repeats this operation m times in this embodiment. Upon completion of the m fourth unit exposure processes, solid-state imaging element 20 causes column transfer gates 33 in column transfer unit 102 to transfer signal charge a4 backward to a packet for which no reading gates 32 exist. That is, first to fourth charge accumulating units P1 to P4 are shifted backward by three levels. Consequently, as indicated by a dotted line in FIG. 4, fourth charge accumulating unit P4 leaves the position where reading gates 32 exist, and first charge accumulating unit P1 moves to the position where reading gates 32 exist.

In this embodiment, the pulse width of the second pulse in the fourth unit exposure process is set to To as with the first pulse of the light emission signal, and as with the second pulse in the first, second, and third unit exposure processes.

After the above series of operations is repeated N times in this embodiment, the signal charge in first to fourth charge accumulating units P1 to P4 is output to signal processor 4 via column signal line 107, column processor 108, and row scanner 109.

According to the configuration in FIGS. 2A and 2B, multiple packets formed in column transfer unit 102 can be used as first to fourth charge accumulating units P1 to P4. This eliminates the need to form additional charge accumulating units, enabling an increase in the aperture ratio (the ratio of the area capable of receiving light per unit area) of photoelectric converters 101 for a given area. This can realize the generation of imaging signals capable of highly accurate ranging with less noise, and the reduction of the sizes of solid-state imaging element 20 and imaging device 10.

FIG. 5 is a timing chart for describing exemplary operations in the first to fourth unit exposure processes according to Embodiment 1. (a) in FIG. 5 shows the timing of detecting the amount of exposure a1 in the first unit exposure process. (b) in FIG. 5 shows the timing of detecting the amount of exposure a2 in the second unit exposure process. (c) in FIG. 5 shows the timing of detecting the amount of exposure a3 in the third unit exposure process. (d) in FIG. 5 shows the timing of detecting the amount of exposure a4 in the fourth unit exposure process.

First, as shown in FIGS. 3 and 4 and (a) in 5, in the first unit exposure process, photoelectric converters 101 are exposed during the period in which the second pulse of the exposure signal is Low. Signal charge a1 generated by the exposure is accumulated in first charge accumulating unit P1. At this point, first charge accumulating unit P1 is a packet formed at the positions of VG5, VG6, and VG1 among column transfer gates 33. Controller 3 repeats this operation m/2 times in this embodiment. Upon completion of the m/2 first unit exposure processes, solid-state imaging element 20 controls column transfer gates 33 to transfer the above signal charge a1 forward through the column to the position of VG3, which is a packet for which no reading gates 32 exist, among column transfer gates 33.

Next, as shown in FIGS. 3 and 4 and (b) in 5, in the second unit exposure process, photoelectric converters 101 are exposed during the period in which the second pulse of the exposure signal is Low. Signal charge a2 generated by the exposure is an exposure period accumulated in second charge accumulating unit P2. At this point, second charge accumulating unit P2 is a packet formed at the positions of VG5, VG6, and VG1 among column transfer gates 33. Controller 3 repeats this operation m times in this embodiment. Upon completion of the m second unit exposure processes, solid-state imaging element 20 causes column transfer gates 33 to transfer the above signal charge a2 to VG3, which is a packet for which no reading gates 32 exist, among column transfer gates 33. Correspondingly, signal charge a1 resulting from the exposure in the first exposure process is transferred to another packet, the position of VH, among column transfer gates 33.

Next, as shown in FIGS. 3 and 4, and (c) in 5, in the third unit exposure process, photoelectric converters 101 are exposed during the period in which the second pulse of the exposure signal is Low. Signal charge a3 generated by the exposure is accumulated in third charge accumulating unit P3. At this point, third charge accumulating unit P3 is a packet formed at the positions of VG5, VG6, and VG1 among column transfer gates 33. Controller 3 repeats this operation m/2 times in this embodiment. Upon completion of the m/2 third unit exposure processes, solid-state imaging element 20 causes column transfer gates 33 to transfer the above signal charge to VG3, which is a packet for which no reading gates 32 exist, among column transfer gates 33. Correspondingly, signal charge a1 resulting from the exposure in the first exposure process is transferred to another packet, the position of next VG3, among column transfer gates 33. Signal charge a2 resulting from the exposure in the second exposure process is transferred to another packet, the position of VH, among column transfer gates 33.

Next, as shown in FIGS. 3 and 4, and (d) in 5, in the fourth unit exposure process, light source 1 does not emit light while photoelectric converters 101 are exposed during the period in which the second pulse of the exposure signal is Low. Signal charge a4 generated by the exposure is accumulated in fourth charge accumulating unit P4. At this point, fourth charge accumulating unit P4 is a packet formed at the positions of VG5, VG6, and VG1 among column transfer gates 33. Controller 3 repeats this operation m times in this embodiment. Upon completion of m fourth unit exposure processes, solid-state imaging element 20 controls column transfer gates 33 to transfer signal charge a1 resulting from the exposure in the first exposure process backward through the column to the packet for which reading gates 32 exist. Correspondingly, as shown in (a) in FIG. 4, signal charge a2 resulting from the exposure in the second exposure process is transferred backward to another packet, VG3, among column transfer gates 33. Signal charge a3 resulting from the exposure in the third exposure process is transferred backward to another packet, VH, among column transfer gates 33. Signal charge a4 resulting from the exposure in the fourth exposure process is transferred backward to another packet, next VG3, among column transfer gates 33. In this manner, the four types of signal charge, i.e., signal charge a1 resulting from the exposure in the first exposure process, signal charge a2 resulting from the exposure in the second exposure process, signal charge a3 resulting from the exposure in the third exposure process, and signal charge a4 resulting from the exposure in the fourth exposure process, are independently stored in the packets in column transfer channel 38 without being mixed. In other words, signal charge a1, a2, a3, and a4 is independently accumulated and held in respective first, second, third, and fourth charge accumulating units P1 to P4.

The above one set of light-emission and exposure processes is repeated N times in this embodiment. Column transfer gates 33 and output control gate 40 are then controlled to cause floating diffusion 34 to convert the signal charge into a voltage signal. Reading circuit 35 is controlled to sequentially output the voltage signal to column signal line 107.

Thus, multiple packets already formed in column transfer channel 38 can be used as multiple charge accumulating units for accumulating signal charge obtained in multiple exposure processes. Some of these exposure processes are different from the other exposure processes in the timing, relative to the first pulse of the light emission signal, of the second pulse of the exposure signal for instructing exposure to reflected light from a target object. This eliminates the need to form additional charge accumulating units, enabling an increase in the aperture ratio (the ratio of the area capable of receiving light per unit area) of photoelectric converters 101 for a given area. This can realize the generation of imaging signals capable of highly accurate ranging with less noise, and the reduction of the sizes of solid-state imaging element 20 and imaging device 10.

Now, details of ranging operations of the imaging device according to this embodiment will be described with reference to FIG. 3.

First, controller 3 outputs the light emission signal and the exposure signal in the first to fourth exposure processes. These exposure processes are different in the timing of the exposure, relative to the light emission signal, of solid-state imaging element 20 to the reflected light from the target object. As described above, in this embodiment, the pulse width of the second pulse of the exposure signal in the first, second, third, and fourth exposure processes is set to To as with the pulse width of the light emission signal period. Therefore, the first, second, third, and fourth exposure processes have the same amount of exposure b1 for the background light. The first delay time period of the second pulse relative to the first pulse in the first and third exposure processes is set to 0. That is, the period in which the second pulse is active in the first and third exposure processes is set to coincide with the period in which the first pulse is at High level. The second delay time period in the second exposure process is set to To, which is the sum of the delay time period 0 in the first and third exposure processes and the exposure signal period To in the first and third exposure processes.

In this embodiment, the first and third unit exposure processes are repeated m/2 times, whereas the second and fourth unit exposure processes are repeated m times. Solid-state imaging element 20 repeats this set of first to fourth exposure processes N times and then outputs exposure signals accumulated. It is assumed here that A1 denotes the total sum of the amounts of exposure a1 in the first exposure processes, A2 denotes the total sum of the amounts of exposure a2 in the second exposure processes, A3 denotes the total sum of the amounts of exposure a3 in the third exposure processes, and A4 denotes the total sum of the amounts of exposure a4 in the fourth exposure processes.

The exposure is performed so that all the reflected light from the target object is received in the period corresponding to the sum of the first or third exposure processes and the second exposure processes. The amount of exposure in the second exposure processes is larger as the delay time period Td of the reflected light from the target object relative to the light emission signal timing is longer. In the fourth exposure processes, only background light b1 is used for the exposure because light source 1 does not emit light.

Signal processor 4 can calculate the distance L by solving Equation 1 below, where C denotes the speed of light (299,792,458 m/s).

$$L = \frac{C \times To}{2} \times \frac{A2 - A4}{A1 + A3 - A4 + A2 - A4} \qquad \text{(Equation 1)}$$

In the first and third exposure processes, the delay time period is minimum (set to 0 in this embodiment) relative to the time at which light source 1 receives the light emission signal and emits light. Therefore, if the object is close, much reflected light from the object is used for the exposure in the first and third exposure processes. This is because the delay of the reflected light from the close object relative to the light emission signal timing (the irradiation light) due to the optical path is short, i.e., the reflected light has a high intensity. As such, repeating the light emission and exposure many times tend to cause saturation.

In this embodiment, however, the number of repetitions in each of the first and third exposure processes is half the number of repetitions in each of the other exposure processes. This advantageously prevents saturation for a close object having a high reflectance and therefore enables highly accurate and saturation-free ranging. At the same time, the sum of the numbers of repetitions in the first and third exposure processes is equal to the number of repetitions in each of the other exposure processes. This advantageously enables highly accurate ranging of a distant object or an object having a low reflectance without suffering from signal-to-noise ratio (S/N) reduction due to a decrease in the amount of exposure. Further, in the case of a CMOS and CCD hybrid structure, parallel signal output via column signal lines (columns) can achieve a high frame rate. This advantageously prevents blur of a fast-moving object and therefore enables highly accurate ranging.

As described above, imaging device 10 according to Embodiment 1 includes: a controller that generates a first pulse for instructing light emission and a second pulse for instructing light exposure; light source 1 that emits light in accordance with the first pulse; and imager 2 including a solid-state imaging element that exposes the light in accordance with the second pulse, wherein solid-state imaging element 20 includes pixel unit 100, pixel unit 100 including: photoelectric converter 101 that converts the light exposed into signal charge; and a plurality of charge accumulating units accumulating the signal charge, and in pixel unit 100, the signal charge includes first signal charge obtained by a first exposure process, second signal charge obtained by a second exposure process, and third signal charge obtained by a third exposure process which are accumulated in different charge accumulating units among the plurality of charge accumulating units, the first exposure process and the third exposure process each being performed in accordance with the second pulse that is delayed from the first pulse by a first delay time period, the second exposure process being performed in accordance with the second pulse that is delayed from the first pulse by a second delay time period.

Here, it is possible that in pixel unit 100, the signal charge further includes fourth signal charge obtained by a fourth exposure process in which the second pulse is generated without generating the first pulse, the fourth signal charge being accumulated in a signal accumulating unit different from the different charge accumulating units accumulating the first signal charge, the second signal charge, and the third signal charge among the plurality of charge accumulating units.

Here, it is also possible that a total of an exposure time period of the first exposure process and an exposure time period of the third exposure process is equal to an exposure time period of the second exposure process.

Here, it is further possible that a total of an exposure time period of the first exposure process and an exposure time period of the third exposure process is equal to an exposure time period of the second exposure process, and an exposure time period of the fourth exposure process is equal to the exposure time period of the second exposure process.

Here, it is still further possible that a pulse width of the first pulse is equal to a pulse width of the second pulse, in the first exposure process, each of a number of the first pulses and a number of the second pulses is m1, where m1 is an integer, in the second exposure process, each of a number of the first pulses and a number of the second pulses is m2, where m2 is an integer greater than m1, and in the third exposure process, each of a number of the first pulses and a number of the second pulses is m3, where m3 is an integer smaller than m2.

Here, it is still further possible that a sum of m1 and m3 is equal to m2.

Here, it is still further possible that in the first exposure process, each of a number of the first pulses and a number of the second pulses is m1, where m1 is an integer, in the second exposure process, each of a number of the first pulses and a number of the second pulses is m2, where m2 is an integer greater than m1, in the third exposure process, each of a number of the first pulses and a number of the second pulses is m3, where m3 is an integer smaller than m2, and in the fourth exposure process, a number of the second pulses is m4, where m4 is equal to m2.

Here, it is still further possible that a sum of m1 and m3 is equal to m2.

Here, it is still further possible that the first delay time period is equal to or greater than 0 and shorter than a time width of the first pulse.

Here, it is still further possible that controller 3 repeats, N times, a set of the first to fourth exposure processes in time series, where N is an integer.

Here, it is still further possible that solid-state imaging element 20 is a Charge-Coupled Device (CCD) imaging element and includes column transfer units 102 provided for a respective one of columns of a plurality of pixel units each being pixel unit 100, and the plurality of charge accumulating units serve as wells for potentials formed in column transfer units 102.

Here, it is still further possible that solid-state imaging element 20 further includes: column signal lines 107 provided for a respective one of columns of the plurality of pixel units 100; and reading circuits 35 provided for a respective one of the plurality of pixel units 100, the reading circuits each converting signal charge read from a selected one of the plurality of charge accumulating units into a voltage and providing the voltage to a corresponding one of column signal lines 107.

Furthermore, solid-state imaging element 20 according to Embodiment 1 is included in an imaging device that includes the imaging device including: controller 3 that generates a first pulse for instructing light emission and a second pulse for instructing light exposure; light source 1 that emits light in accordance with the first pulse; and imager 2 including solid-state imaging element 20 that exposes the light in accordance with the second pulse, solid-state imaging element 20, comprising: pixel unit 100, pixel unit 100 including: photoelectric converter 101 that converts the light exposed into signal charge; and a plurality of charge accumulating units accumulating the signal charge, wherein in pixel unit 100, the signal charge includes first signal charge obtained by a first exposure process, second signal charge obtained by a second exposure process, and third signal charge obtained by a third exposure process which are accumulated in different charge accumulating units among the plurality of charge accumulating units, the first exposure process and the third exposure process each being performed in accordance with the second pulse that is delayed from the first pulse by a first delay time period, the second exposure process being performed in accordance with the second pulse that is delayed from the first pulse by a second delay time period.

Embodiment 2

Embodiment 1 has described an example of a hybrid image sensor having the 2-pixels-in-1-cell structure as solid-state imaging element 20. Embodiment 2 will describe an example of a hybrid image sensor having the 1-pixel-in-1-cell structure as solid-state imaging element 20.

Imaging device 10 in Embodiment 2 is configured as in FIG. except that solid-state imaging element 20 has the 1-pixel-in-1-cell structure rather than the 2-pixels-in-1-cell structure. The following will mainly describe differences.

First, an exemplary configuration of solid-state imaging element 20 will be described.

FIG. 6A is a block diagram showing an exemplary configuration of solid-state imaging element 20 according to Embodiment 2. This figure is similar to FIG. 2A except that each pixel unit 100 includes one photoelectric converter 101 rather than two photoelectric converters 101.

Now, an exemplary configuration of each pixel unit 100 will be described.

FIG. 6B is a diagram showing an exemplary configuration of each pixel unit 100 in solid-state imaging element 20 according to Embodiment 2. This figure is different from FIG. 2B in that each pixel unit 100 has one set, not two sets, of one photoelectric converter 101, one reading gate 32, one exposure control gate 36, and one overflow drain 37. Column transfer unit 102 includes eight types of column transfer gates 33 for each pixel unit 100. Eight types of column transfer gates 33 are denoted as VG1 to VG7, and VH. Column transfer unit 102 thus forms, as first to fourth charge accumulating units P1 to P4, four packets for each photoelectric converter 101. The four packets can be formed at column transfer gates VG2, VG4, VG6, and VH, respectively.

Now, exemplary imaging operations of imaging device 10 according to Embodiment 2 will be described. The exemplary imaging operations in this embodiment are the same as those described in FIG. 3. However, the positions of first to fourth charge accumulating units P1 to P4 in column transfer unit 102 are somewhat different.

Figure 7:
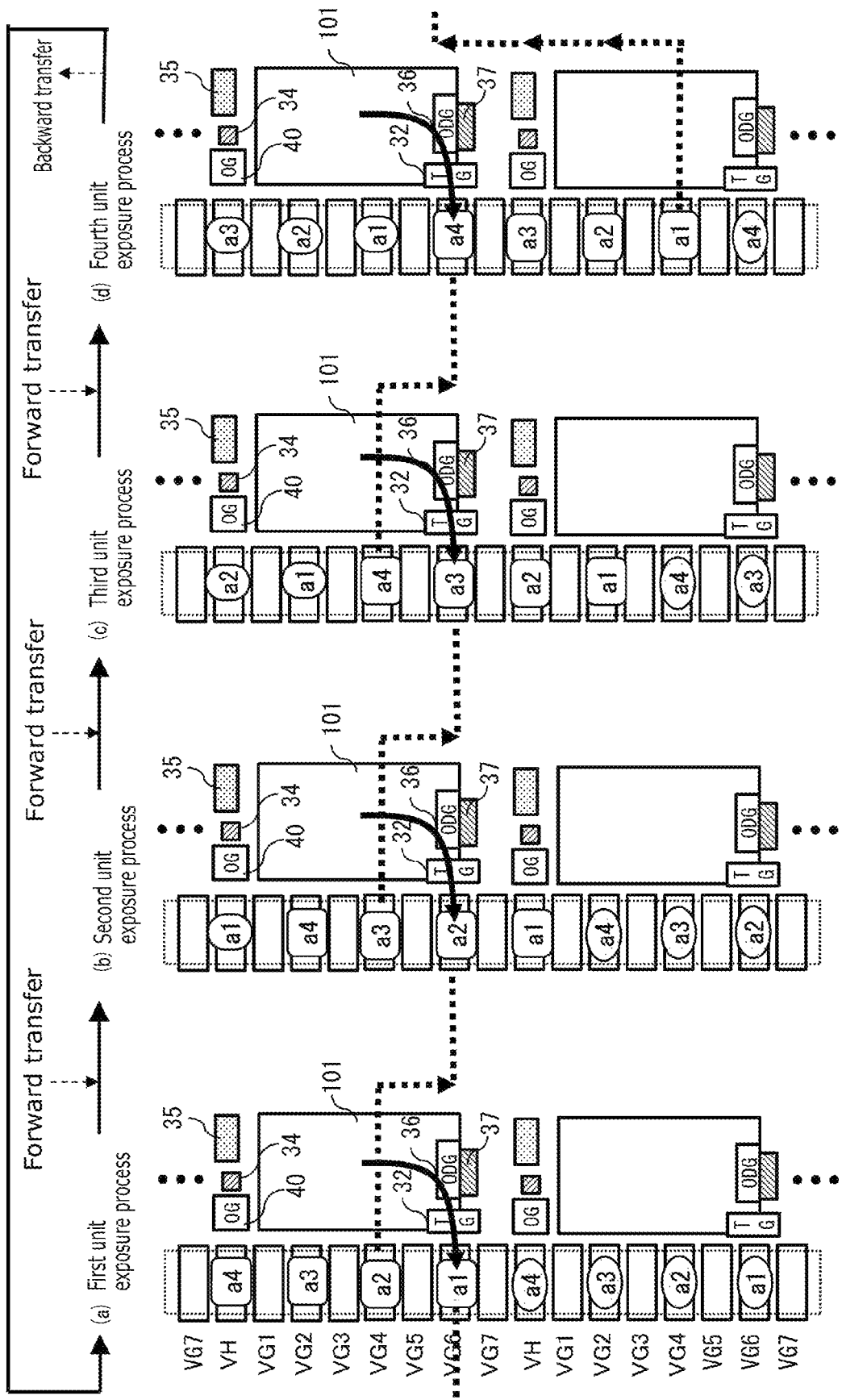
FIG. 7 is a diagram showing exemplary operations in first to fourth unit exposure processes in each pixel unit in the solid-state imaging element according to Embodiment 2.

FIG. 7 is a diagram showing exemplary operations in the first to fourth unit exposure processes in each pixel unit in the solid-state imaging element according to Embodiment 2. This figure is different from FIG. 4 in that, in each unit exposure process, signal charge is transferred to column transfer unit 102 from one photoelectric converter 101 rather than two photoelectric converters 101. This figure is also different in the positions of column transfer gates 33 at which the packets are formed. Otherwise this figure is the same as FIG. 4.

Imaging device 10 according to Embodiment 2 as above can provide the same advantages as those in Embodiment 1.

Instead of solid-state imaging element 20 shown in FIGS. 6A and 6B, a CCD image sensor may also be used.

Embodiment 3

Embodiments 1 and 2 have described an image sensor having a CMOS and CCD hybrid structure as the solid-state imaging element. Solid-state imaging element 20 is, however, not limited to such an image sensor but may be other types of image sensors (as an example, a CCD image sensor). Embodiment 3 will describe an example of a CMOS image sensor as solid-state imaging element 20.

First, an exemplary configuration of solid-state imaging element 20 will be described.

Figure 8A:
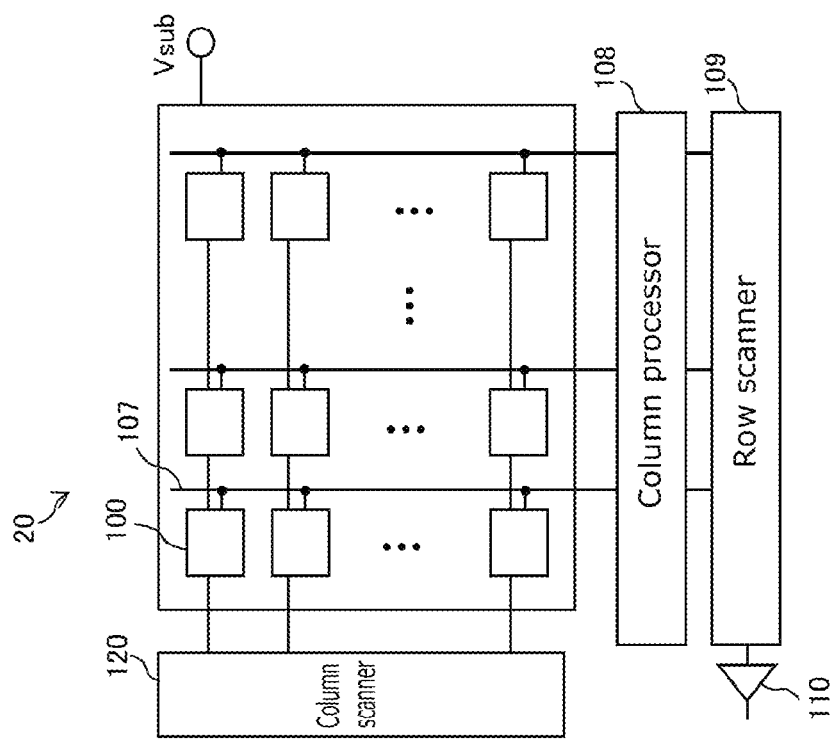
FIG. 8A is a block diagram showing an exemplary configuration of a solid-state imaging element according to Embodiment 3.

FIG. 8A is a block diagram showing an exemplary configuration of solid-state imaging element 20 according to Embodiment 3. This solid-state imaging element 20 includes: two-dimensionally arranged pixel units 100; column signal lines 107 disposed for respective columns of pixel units 100; column scanner 120; column processor 108; row scanner 109, and output buffer 110.

Each of pixel units 100 includes photoelectric converter 101 having an overflow-drain structure and is capable of global shutter operation.

Column processor 108, row scanner 109, and output buffer 110 are similar to those in FIG. 2A.

Column scanner 120 scans pixel units 100 on a row basis. Pixel units 100 in a row selected in the scan output pixel signals via column signal lines 107.

Now, an exemplary configuration of each pixel unit 100 will be described.

Figure 8B:
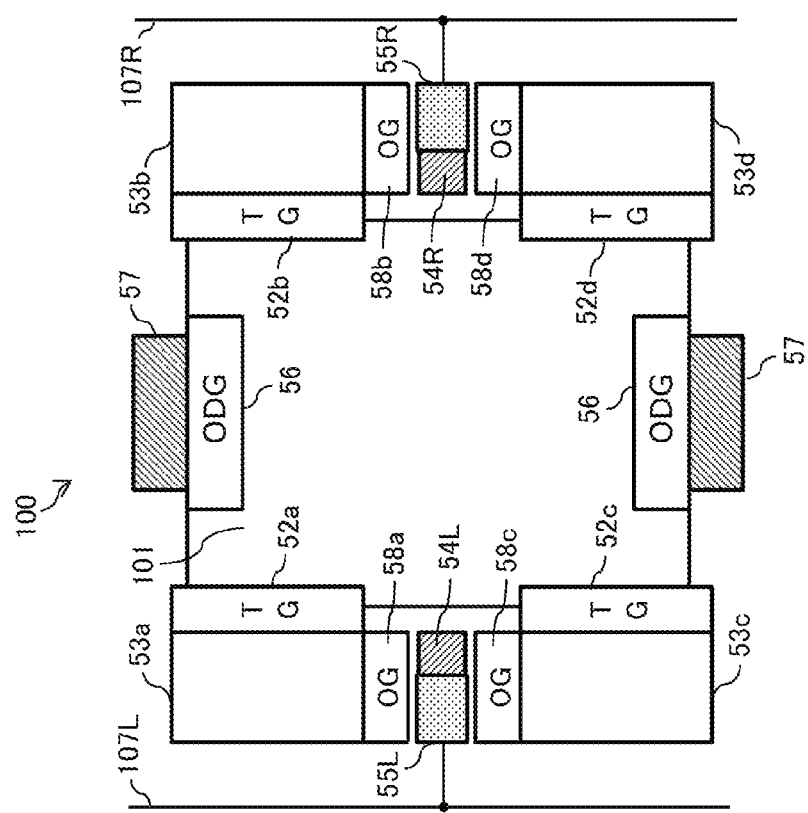
FIG. 8B is a diagram showing an exemplary configuration of each pixel unit in the solid-state imaging element according to Embodiment 3.

FIG. 8B is a diagram showing an exemplary configuration of each pixel unit in the solid-state imaging element according to Embodiment 3. As in the figure, pixel unit 100 includes photoelectric converter 101, two exposure control gates 56, two overflow drains 57, reading gates 52a to 52d, holding gates 53a to 53d, output control gates 58a to 58d, floating diffusion layers 54L and 54R, and reading circuits 55L and 55R.

Photoelectric converter 101 generates signal charge corresponding to the amount of light received.

Two exposure control gates 56 and two overflow drains 57 let out the signal charge of photoelectric converter 101. This enables global shutter operation in which all pixel units 100 simultaneously start exposure.

Reading gates 52a to 52d and holding gates 53a to 53d constitute first to fourth charge accumulating units. First to fourth charge accumulating units P1 to P4 in FIG. 8B are different from first to fourth charge accumulating units P1 to P4 shown in FIGS. 2B and 6B in that they are fixed areas.

Output control gates 58a and 58c are gate electrodes for transferring the signal charge accumulated in holding gates 53a and 53c (i.e., the first and third charge accumulating units) to floating diffusion layer 54L.

Output control gates 58b and 58d are gate electrodes for transferring the signal charge accumulated in holding gates 53b and 53d (i.e., the second and fourth charge accumulating units) to floating diffusion layer 54R.

Floating diffusion layer 54L and reading circuit 55L convert the signal charge in floating diffusion layer 54L into a voltage signal and output the voltage signal to column signal line 107L.

Floating diffusion layer 54R and reading circuit 55R convert the signal charge in floating diffusion layer 54R into a voltage signal and output the voltage signal to column signal line 107R.

Column signal lines 107L and 107R may be electrically connected and regarded as substantially the same signal line, or may be independent signal lines.

Exemplary imaging operations of imaging device 10 according to Embodiment 3 will be described. The exemplary imaging operations in this embodiment are the same as those described for FIG. 3, except that first to fourth charge accumulating units P1 to P4 are fixed areas.

Exemplary imaging operations of imaging device 10 according to Embodiment 3 will be described. The exemplary imaging operations in this embodiment are the same as those described for FIG. 3.

Embodiment 1 has described a CCD image sensor and an image sensor having a CMOS and CCD hybrid structure as the solid-state imaging element. Solid-state imaging element 20 used in the present disclosure is, however, not limited to such image sensors but can be other types of image sensors (as an example, a CMOS image sensor, or an image sensor having a photoelectric conversion film).

As described above, in imaging device 10 according to Embodiment 3, solid-state imaging element 20 is of CMOS type.

Other Embodiments

Thus, the imaging device and the solid-state imaging element in the present disclosure have been described based on the above embodiments and their variations. The imaging device and the solid-state imaging element in the present disclosure are not limited to the above embodiments and their variations. The present disclosure includes other embodiments implemented by combinations of any components of the above embodiments and their variations. The present disclosure also includes variations obtained by making modifications occurring to those skilled in the art to the above embodiments and their variations without departing from the spirit of the present disclosure. The present disclosure further includes various apparatuses having the imaging device and the solid-state imaging element in the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The imaging device according to present disclosure realizes accurate 3D detection and measurement of target objects having a wide range of reflectances in the same screen, from close target objects having higher reflectances to distant target objects having lower reflectances. The imaging device is therefore useful for 3D detection, display, and depiction (e.g., point cloud) of people, buildings, and organs and tissues of human bodies, animals, or plants, line-of-sight direction detection, gesture recognition, face authentication, obstacle detection, and road surface detection.

The invention claimed is:
1. An imaging device, comprising:
a controller that generates a first pulse for instructing light emission and a second pulse for instructing light exposure;
a light source that emits light in accordance with the first pulse;
an imager including a solid-state imaging element that exposes the light in accordance with the second pulse; and
a signal processor,
wherein the solid-state imaging element includes pixel units, the pixel units each including: a photoelectric converter that converts the light exposed into signal charge; and a plurality of charge accumulating units accumulating the signal charge,
in each of the pixel units,
the signal charge includes first signal charge obtained by a first exposure process, second signal charge obtained by a second exposure process, and third signal charge obtained by a third exposure process which are accumulated in different charge accumulating units among the plurality of charge accumulating units,
the first exposure process and the third exposure process each being performed in accordance with the second pulse that is delayed from the first pulse by a first delay time period, the second exposure process being performed in accordance with the second pulse that is delayed from the first pulse by a second delay time period,
the first exposure process, the second exposure process, and the third exposure process are performed in this order, and a total of an exposure time period of the first exposure process and an exposure time period of the third exposure process is equal to an exposure time period of the second exposure process, and the signal processor calculates a distance signal for each of the pixel units by using the first signal charge obtained by the first exposure process, the second signal charge obtained by the second exposure process, and the third signal charge obtained by the third exposure process.

2. The imaging device according to claim 1, wherein in each of the pixel units, the signal charge further includes fourth signal charge obtained by a fourth exposure process in which the second pulse is generated without generating the first pulse, the fourth signal charge being accumulated in a charge accumulating unit different from the different charge accumulating units accumulating the first signal charge, the second signal charge, and the third signal charge among the plurality of charge accumulating units.

3. The imaging device according to claim 2, wherein an exposure time period of the fourth exposure process is equal to the exposure time period of the second exposure process.

4. The imaging device according to claim 1, wherein a pulse width of the first pulse is equal to a pulse width of the second pulse,
in the first exposure process, each of a number of the first pulses and a number of the second pulses is m1, where m1 is an integer,
in the second exposure process, each of a number of the first pulses and a number of the second pulses is m2, where m2 is an integer greater than m1,
in the third exposure process, each of a number of the first pulses and a number of the second pulses is m3, where m3 is an integer smaller than m2, and
a sum of m1 and m3 is equal to m2.

5. The imaging device according to claim 2, wherein in the first exposure process, each of a number of the first pulses and a number of the second pulses is m1, where m1 is an integer,
in the second exposure process, each of a number of the first pulses and a number of the second pulses is m2, where m2 is an integer greater than m1,
in the third exposure process, each of a number of the first pulses and a number of the second pulses is m3, where m3 is an integer smaller than m2,
in the fourth exposure process, a number of the second pulses is m4, where m4 is equal to m2,
a sum of m1 and m3 is equal to m2.

6. The imaging device according to claim 1, wherein the first delay time period is equal to or greater than 0 and shorter than a time width of the first pulse.

7. The imaging device according to claim 5, wherein the controller repeats, N times, a set of the first to fourth exposure processes in time series, where N is an integer.

8. The imaging device according to claim 2, wherein the solid-state imaging element is a Charge-Coupled Device (CCD) imaging element and includes column transfer units provided for a respective one of columns of the pixel units, and
the plurality of charge accumulating units serve as wells for potentials formed in the column transfer units.

9. The imaging device according to claim 8, wherein the solid-state imaging element further includes:
column signal lines provided for a respective one of columns of the pixel units; and
reading circuits provided for a respective one of the pixel units, the reading circuits each converting signal charge read from a selected one of the plurality of charge accumulating units into a voltage and providing the voltage to a corresponding one of the column signal lines.

10. The imaging device according to claim 2, wherein the solid-state imaging element is a Complementary Metal Oxide Semiconductor (CMOS) imaging element.

11. The imaging device according to claim 1, wherein the second delay time period is longer than the first delay time period.

12. A solid-state imaging element included in an imaging device,
the imaging device including:
a controller that generates a first pulse for instructing light emission and a second pulse for instructing light exposure;
a light source that emits light in accordance with the first pulse; and
an imager including the solid-state imaging element that exposes the light in accordance with the second pulse,
the solid-state imaging element, comprising:
pixel units,
each of the pixel units including:
a photoelectric converter that converts the light exposed into signal charge; and
a plurality of charge accumulating units accumulating the signal charge, wherein
in each of the pixel units,
the signal charge includes first signal charge obtained by a first exposure process, second signal charge obtained by a second exposure process, and third signal charge obtained by a third exposure process which are accumulated in different charge accumulating units among the plurality of charge accumulating units,
the first exposure process and the third exposure process each being performed in accordance with the second pulse that is delayed from the first pulse by a first delay time period, the second exposure process being performed in accordance with the second pulse that is delayed from the first pulse by a second delay time period,
the first exposure process, the second exposure process, and the third exposure process are performed in this order, and a total of an exposure time period of the first exposure process and an exposure time period of the third exposure process is equal to an exposure time period of the second exposure process, and
a distance signal for each of the pixel units is calculated by using the first signal charge obtained by the first exposure process, the second signal charge obtained by the second exposure process, and the third signal charge obtained by the third exposure process.

13. An imaging method used in an imaging device,
the imaging device including:
a controller that generates a first pulse for instructing light emission and a second pulse for instructing light exposure;
a light source that emits light in accordance with the first pulse; and
an imager including the solid-state imaging element that exposes the light in accordance with the second pulse,
the solid-state imaging element including pixel units,
each of the pixel units including:
a photoelectric converter that converts the light exposed into signal charge; and
a plurality of charge accumulating units that accumulates the signal charge, the imaging method, comprising:

accumulating, into a first charge accumulating unit among the plurality of charge accumulating units in each of the pixel units, first signal charge obtained by a first exposure process performed in accordance with the second pulse that is delayed from the first pulse by a first delay time period;

accumulating, into a second charge accumulating unit among the plurality of charge accumulating units in each of the pixel units, second signal charge obtained by a second exposure process performed in accordance with the second pulse that is delayed from the first pulse by a second delay time period; and accumulating, into a third charge accumulating unit among the plurality of charge accumulating units in each of the pixel units, third signal charge obtained by a third exposure process performed in accordance with the second pulse that is delayed from the first pulse by the first delay time period; and calculating a distance signal for each of the pixel units by using the first signal charge accumulated in the first charge accumulating unit, the second signal charge accumulated in the second charge accumulating unit, and the third signal charge accumulated in the third charge accumulating unit, wherein the first exposure process, the second exposure process, and the third exposure process are performed in this order, and a total of an exposure time period of the first exposure process and an exposure time period of the third exposure process is equal to an exposure time period of the second exposure process.

* * * * *